Patented Feb. 11, 1941

2,231,838

UNITED STATES PATENT OFFICE 2,231,838

TRICHLOROPROPIONITRILE AND METHOD OF PREPARING THE SAME

Joy G. Lichty, Stow, Ohio, assignor to Wingfoot Corporation, Wilmington, Del., a corporation of Delaware No Drawing. Application March 15, 1940,
Serial No. 324,143

9 Claims. (Cl. 260—464)

This invention relates to the chlorination of acrylonitrile to yield various chlorine-containing compounds, among them trichloropropionitrile.

Investigation of the course taken by the reaction when chlorine is passed into acrylonitrile shows that the chief products are beta chloro propionitrile and alpha-dichloro beta-chloropropionitrile, the latter being a compound not heretofore described. The course of the reaction may be varied somewhat by controlling the amount of chlorine which is added, less than a molecular proportion of chlorine resulting in substantial amounts of monochloropropionitrile while the addition of more than an equimolecular proportion of chlorine tends to form a larger quantity of trichloropropionitrile. Thus, a lesser amount of chlorine induces the following reaction:

$$CH_2=CHCN + HCl \rightarrow CH_2Cl-CH_2CN$$

probably as a consequence of the generation of hydrogen chloride in accompanying reactions; while the addition of more chlorine causes the monochloro compound to go over to the trichloro compound through the dichloropropionitrile, as follows:

$$CH_2ClCH_2CN + Cl_2 \rightarrow CH_2ClCHClCN + HCl$$
$$CH_2ClCHClCN + Cl_2 \rightarrow CH_2ClCCl_2CN + HCl$$

Chlorination of acrylonitrile thus results in the formation of both monochlor and trichlor propio nitriles when the chlorine is added in less than equimolecular proportions and results in the formation of more and more of the trichloro compound at the expense of the monochlor compound as chlorine continues to be passed in. The alpha, beta, dichlorpropionitrile is, apparently, a transition product and is not found in substantial amounts in the reacted material. It can be obtained, however, by other means and used as the starting material for conversion to the trichloro compound.

The following examples illustrate the invention:

Example 1

Chlorine was bubbled into a 159 gram portion of acrylonitrile containing a small amount of polymerization inhibitor, such as hydroquinone, until the increase in weight was 118 grams. The chlorination was carried out at a temperature of about 20–25° C. The reaction product, after standing overnight, was distilled under reduced pressure and the following fractions were retained:

| | B. P. | Wt. g. | $N_D^{29}$ | $D^{29}$ |
|---|---|---|---|---|
| 1 | 75° C./60 mm.–88/58 mm | 135.2 | 1.4617 | 1.405 |
| 2 | 97° C./58 mm | 42.7 | 1.4358 | 1.140 |
| | Residue | 25.5 | | |

Redistilled the above fractions.

| | | | $N_D^{24}$ | $D^{24}$ |
|---|---|---|---|---|
| A-1 | 79–80° C./63 mm | 12.2 | | |
| A-2 | 80–81° C./63 mm | 103.6 | 1.4658 | 1.423 |
| A-3 | 81–98° C./63 mm | 13.9 | | |
| A-4 | 98° C./61 mm | 35.5 | 1.4379 | 1.153 |
| | Residue | 5.7 | | |

Fraction A–2, on analysis, gave 66.02% Cl—the calculated value for trichloropropionitrile is 67.3%. Also, the physical properties of Fraction A–4 were in close agreement with those given in the literature for beta chloro propionitrile.

Example 2

A 265 gram portion of acrylonitrile was chlorinated at room temperature until the total increase in weight was 419 grams. This, on distillation, yielded 560 grams of a product having a boiling point of 70–75° C./30 mm., a 90% yield of trichloropropionitrile.

To illustrate the conversion of beta-chloropropionitrile into trichloropropionitrile upon continued chlorination, the following run was made:

Example 3

Chlorine was bubbled into 188 grams of beta chloropropionitrile until the increase in weight was 30 grams. After two distillations, there was obtained 45.4 grams of a product boiling at 160–163° C. The density at 29° C. was 1.32 and the index of refraction was 1.4569. Residues from the above reaction were again chlorinated and the ultimate product, on distillation, had a boiling point of 155° C., a density of 1.404 and an index of refraction of 1.4630. Thus, it appears that beta-chloropropionitrile fully chlorinates to the trichloropropionitrile.

It will be apparent that the conditions of the reaction set forth may be modified in various particulars without departing from the scope of the invention. The polymerization inhibitor, where employed, may be any known to be effective for this purpose, such as hydroquinone, phenyl beta naphthylamine, diphenyl para phenylene diamine, etc. The temperature may also be varied somewhat, a range from 10–60° C. being most effective.

While there have been described above certain preferred embodiments of the invention, it will be apparent that various changes and modifications may be made therein without departing from the spirit of the invention. Accordingly, the invention is to be limited only by the appended claims in which it is intended to set forth all features of patentable novelty residing therein.

I claim:

1. A method of preparing trichloro-propionitrile which comprises passing chlorine into one of the group consisting of acrylonitrile, beta-chloro-propionitrile, and alpha-beta-dichloro-propionitrile.

2. A method of preparing trichloropropionitrile which comprises passing chlorine into one of the group consisting of acrylonitrile, beta-chloro-propionitrile, and -alpha-beta, dichloro propionitrile, and then distilling to recover the trichloropropionitrile.

3. A method of preparing trichloropropionitrile which comprises passing chlorine into beta-chloro-propionitrile in the presence of a polymerization inhibitor and then distilling to recover the trichloropropionitrile.

4. A method of preparing trichloropropionitrile which comprises passing chlorine into acrylonitrile and then distilling to recover the trichloropropionitrile.

5. A method of preparing trichloropropionitrile which comprises passing chlorine into acrylonitrile at a temperature between about 10° C. and about 60° C. in the presence of a polymerization inhibitor and then distilling under reduced pressure to recover the trichloropropionitrile.

6. A method of preparing trichloropropionitrile which comprises passing chlorine into acrylonitrile at a temperature between about 10° C. and about 60° C. in the presence of hydroquinone, and then distilling under reduced pressure to obtain a fraction containing chiefly alpha dichloro beta chloropropionitrile.

7. A method of preparing alpha dichloro beta chloropropionitrile which comprises passing chlorine into acrylonitrile at a temperature between about 10° C. and about 60° C. until the density corresponds substantially to that of the trichloropropionitrile and then distilling the chlorinated liquid under a pressure corresponding to from 60 to 90 mm. of mercury to obtain the alpha dichloro beta chloropropionitrile.

8. Trichloropropionitrile.

9. Alpha dichloro beta chloropropionitrile.

JOY G. LICHTY.